(12) United States Patent
Meijler et al.

(10) Patent No.: US 8,938,720 B2
(45) Date of Patent: Jan. 20, 2015

(54) TRACE VISUALIZATION FOR OBJECT ORIENTED PROGRAMS

(75) Inventors: Theo Dirk Meijler, Dresden (DE); Frank Nietzold, Dresden (DE)

(73) Assignee: SAP SE, Walldorf (DE)

(*) Notice: Subject to any disclaimer, the term of this patent is extended or adjusted under 35 U.S.C. 154(b) by 1077 days.

(21) Appl. No.: 12/957,135

(22) Filed: Nov. 30, 2010

(65) Prior Publication Data
US 2012/0137273 A1 May 31, 2012

(51) Int. Cl.
*G06F 9/44* (2006.01)
*G06F 11/36* (2006.01)
*G06F 11/34* (2006.01)

(52) U.S. Cl.
CPC ........ *G06F 11/3636* (2013.01); *G06F 11/3476* (2013.01); *G06F 11/3612* (2013.01); *G06F 11/3664* (2013.01)
USPC ....................................................... 717/128

(58) Field of Classification Search
CPC ............ G06F 11/36–11/3696; G06F 11/3466; G06F 11/3476
USPC ....................................................... 717/128
See application file for complete search history.

(56) References Cited

U.S. PATENT DOCUMENTS

| | | | | |
|---|---|---|---|---|
| 5,898,873 A * | 4/1999 | Lehr | | 717/125 |
| 6,226,787 B1 * | 5/2001 | Serra et al. | | 717/125 |
| 6,678,883 B1 * | 1/2004 | Berry et al. | | 717/128 |
| 6,865,508 B2 * | 3/2005 | Ueki et al. | | 702/181 |
| 7,526,550 B2 * | 4/2009 | Frey et al. | | 709/225 |
| 2004/0210877 A1 * | 10/2004 | Sluiman et al. | | 717/130 |
| 2005/0183067 A1 * | 8/2005 | Dimpsey et al. | | 717/128 |
| 2006/0085798 A1 * | 4/2006 | Bendiksen et al. | | 719/318 |
| 2006/0248512 A1 * | 11/2006 | Messmer et al. | | 717/125 |
| 2006/0293940 A1 * | 12/2006 | Tsyganskiy et al. | | 705/8 |
| 2007/0043861 A1 * | 2/2007 | Baron et al. | | 709/224 |
| 2008/0270995 A1 * | 10/2008 | Dimpsey et al. | | 717/128 |
| 2009/0164980 A1 * | 6/2009 | Rossmann et al. | | 717/128 |
| 2010/0088683 A1 * | 4/2010 | Golender et al. | | 717/128 |

OTHER PUBLICATIONS

Understanding Execution Traces Using Massive Sequence and Circular Bundle Views-Bas Cornelissen, Andy Zaidman, Leon Moonen-Delft University of Technology, Danny Holten, Jarke J. van Wijk—Eindhoven University of Technology, and Arie van Deursen-Delft University of Technology & CWI-15 IEEE International Conference on Program Comprehension-2007.*

* cited by examiner

*Primary Examiner* — Lewis A Bullock, Jr.
*Assistant Examiner* — Francisco Aponte
(74) *Attorney, Agent, or Firm* — Schwegman Lundberg & Woessner, P.A.

(57) ABSTRACT

A method is provided to produce an information structure that indicates call hierarchy relationships among calls of a trace log file and that indicates time sequence relationships among calls of the trace log file, the method comprising: producing call records that correspond to calls identified in the trace log file; creating call hierarchy indicia that indicate hierarchical relationships among calls that correspond to the call records; and creating time sequence indicia that indicate time sequence relationships among calls that correspond to the call records.

19 Claims, 10 Drawing Sheets

Some Relationships And Dependencies Are:
- A Is Parent Of B; C; D
- E Is Parent Of F
- F Is Parent Of G; H
- I Is Parent Of J; K; L
- B; C; D Are Children Of A
- F Is Child Of E
- G; H Are Childen Of F
- J; K; L Are Children Of I
- A Is Previous To E
- I Is Next To E
- E Is Previous To I
- B Is Previous To C
- C Is Next To B
- D Is Previous To F

TRACE VISUALIZATION FOR OBJECT ORIENTED PROGRAMS

BACKGROUND

A 'log file' typically records events that occur in a computer system. Some example events include "call", "execute", "open", "close", "wait", "fetch", "sort", "append", "run", and "delete". A code trace or 'trace' comprises a text listing of events in chronological order in which the events occur in a computer system. A 'trace log file' comprises a log file in which a trace is recorded as computer program code executes within a computer system. A trace log file may contain time information indicative of the time of occurrence of events recorded within the trace. A trace log file, therefore, reports transformations of computer system configuration to process different computer program instructions over some time frame.

In general, a trace includes information on source code but not the source code itself, e.g. if the source code is 'CALL METHOD ABC', this may be seen as 'CALL METHOD ABC' in the trace, for example. However, a source code line such as 'A=A+1' will not be recorded at all and may be accounted to the parent event as its net time, for example. However, the trace can in fact record information about the source code because in the mode of tracing the source code may not be complied completely or the execution of complied code can be linked back to the source code by means of debug information and source code addresses.

A call trace includes text that is representative of 'calls'. A call is a request by one computer program or process for service from another program or process. It is not unusual for a program or process to spawn a hierarchy of calls in which a called program calls another program and that other program calls yet another program, for example. Calls and call hierarchies often are recorded within trace log files. A trace log file contains much explicit time related information such as call level, gross time and net time for an event.

Figure 1A:
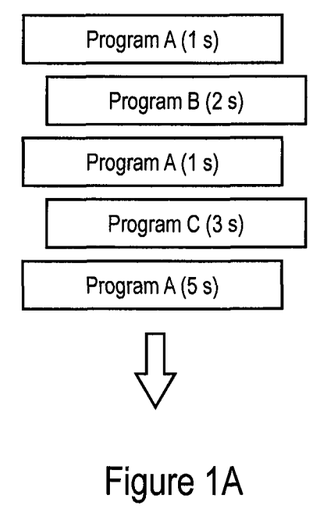
FIGS. 1A-1B are illustrative drawings showing call level relationships and time durations of a hierarchy of calls (FIG. 1A) and net time and gross times (FIG. 1B) of the programs within the call hierarchy.
Figure 1B:
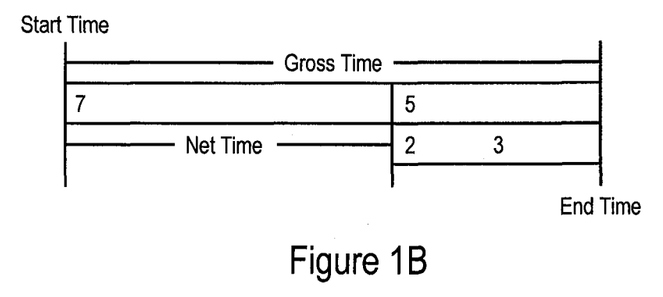

FIGS. 1A-1B are illustrative drawings showing call level relationships and time durations of a hierarchy of calls (FIG. 1A) and net time and gross times (FIG. 1B) of the programs within the call hierarchy. Referring to FIG. 1A, program A first calls program B, and next calls program C. In this call hierarchy, program A is the calling program that is at a higher level in the hierarchy and programs B and C are called programs that are at a lower level in the hierarchy. As used herein, 'net time' signifies time spent in a program, method, function or the like that cannot be split further into sub calls, sub functions, sub programs, etc. it typically includes all basic operations such as concatenating strings or elementary mathematical operations, and 'gross time' signifies the net time of a program, call, method, function or alike plus the sum of all gross times of its child calls, programs, methods, functions and so on. In this example, program A has a net time of 1+1+5=7 seconds; program B has a net time of 2 seconds; program C has a net time of 3 seconds. Called programs B and C occur in the course of the running of program A. The run times of programs B and C are added to the net time of Program A to determine the gross time of Program A, which is 7+2+3=12 in this example.

Figure 2:
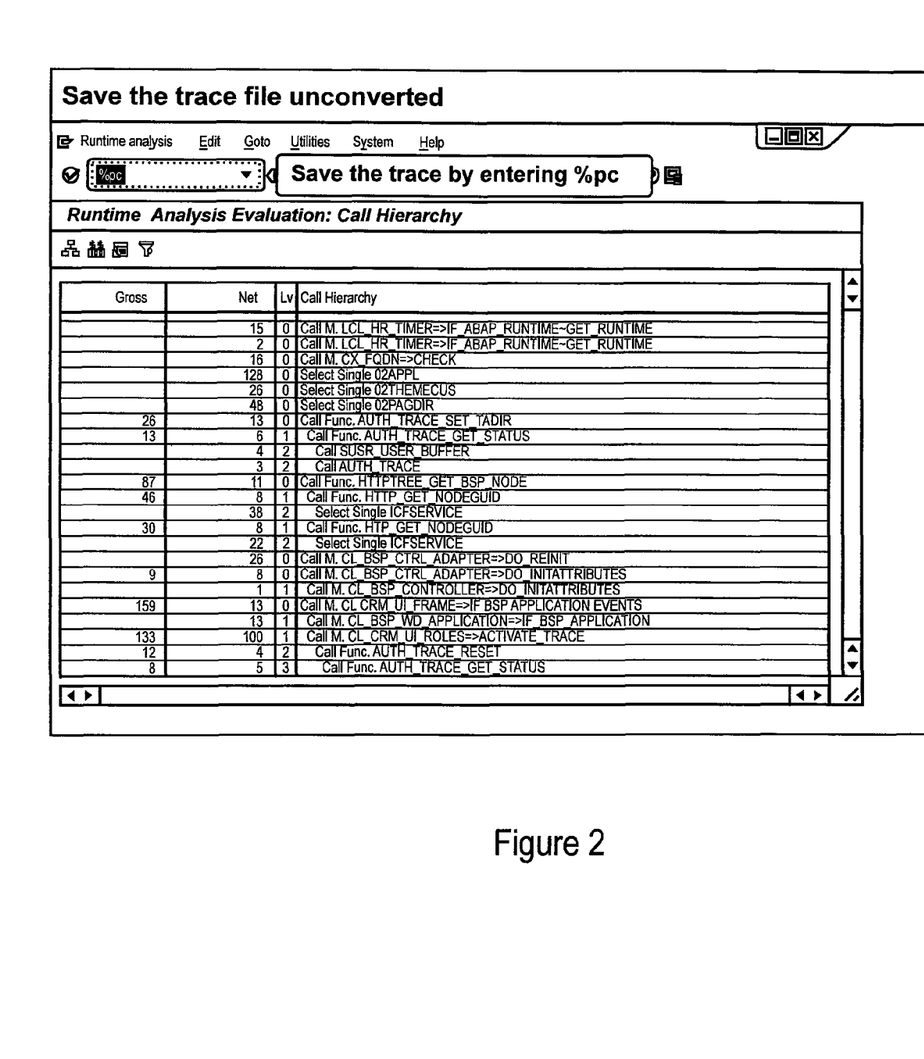
FIG. 2 is an illustrative computer generated user interface display showing call hierarchy relationships among a chronological sequence of call events within a trace log file.

FIG. 2 is an illustrative computer generated user interface display showing call hierarchy relationships among a chronological sequence of call events within a trace log file. Call events near the top of the list occur before call events lower on the list. The display shows gross times and net times for calls, call levels and text indicative of the call events. Each row in the display represents a different call log record. The call text in each row identifies the event to one skilled in the art. Call level 0 is the highest call level, followed in order by call level 1, call level 2, etc. The, display includes both time sequence information through the chronological ordering of call events and call hierarchy information through the call hierarchy relationships among calls.

Detailed text traces of object orientated coded computer program based applications are very long and difficult to read since they often include hundreds of thousands or millions of call event log entries. Using a text-only call trace to analyze an application, therefore, can be time consuming or perhaps only feasible following some aggregation of log entries. Aggregation, however, poses a risk of losing important information especially since object orientated frameworks can be made up of hundreds of different parts and can effectively not be easily aggregated. Efficient software product optimizations during software development often rely upon quick access to detailed and accurate information on response times, for example, and may require insight into large blocks of atomic log entries ranging from a few hundred to tens of thousands entries to be handled simultaneously. While software tools are known that optimize single calls, there has been a need for an improvement in approaches to analysis of complex call structures that are typical within complex object frameworks and call hierarchies.

SUMMARY

In one aspect, a method produces an information structure in as computer readable storage device that indicates call hierarchy relationships among calls of a trace log file and that indicates time sequence relationships among calls of the trace log file. The method involves producing call records that correspond to calls identified in the trace log file. Call hierarchy indicia are created that indicate hierarchical relationships among calls that correspond to the respective call records. Time sequence indicia are created that indicate time sequence relationships among calls that correspond to the respective call records.

In another aspect, a method generates a computer user interface screen display representing call trace entries in a trace log file. The method involves displaying a plurality of discrete display regions on a computer display screen that correspond to call entries within the trace log file. The discrete regions are aligned vertically according to call hierarchy relationships among calls. The discrete regions are aligned horizontally according to time sequence relationships among calls that are within the same call hierarchy level.

In yet other aspects computer readable device is encoded with computer program code to produce the information structure that includes a multiplicity of call records that correspond to calls within a trace log file. Call hierarchy indicia indicate hierarchical relationships among calls that correspond to the call records. Time sequence indicia indicate previous and next relationships among calls that correspond to the call records.

These and other features of embodiments will be apparent from the following description of embodiments in conjunction with the appended drawings.

DESCRIPTION OF EMBODIMENTS

The following description is presented to enable any person skilled in the art to create and use a computer system configuration and related method and article of manufacture to produce and use a graphical user interface view of a trace log file comprising a hierarchy of call events. Various modifications to the preferred embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and processes are shown in block diagram form in order not to obscure the description of the invention with unnecessary detail. Thus, the present invention is not intended to be limited to the embodiments shown, but is to be accorded the widest scope consistent with the principles and features disclosed herein.

Figure 3:
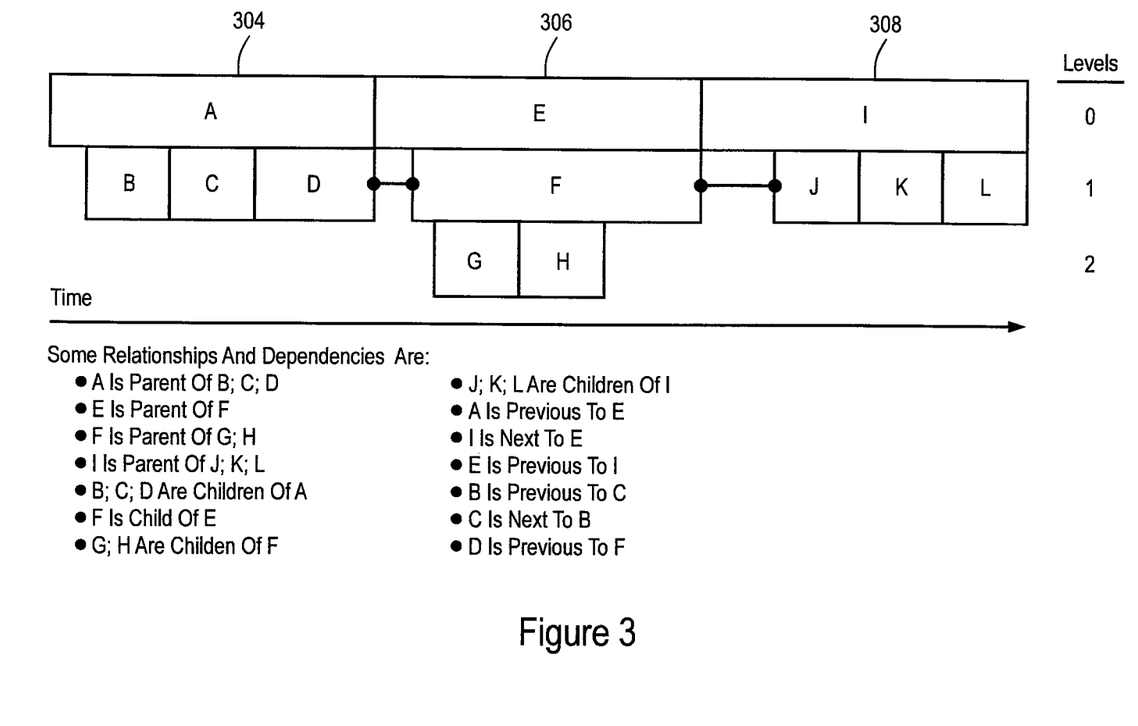
FIG. 3 is an illustrative drawing of a computer user interface screen display of a call trace structure that graphically represents call hierarchy relationships and chronological times of occurrence of call events within a trace log file in accordance with some embodiments.

User Interface Trace Display Showing Parent/Child and Previous/Next Relationships FIG. 3 is an illustrative drawing of a computer user interface screen display of a call trace structure that graphically represents call hierarchy relationships and chronological times of occurrence of call events within a trace log file in accordance with some embodiments. Each of the regions labeled A through L represents a call entry and may be referred to herein as a 'discrete display region' or 'discrete region'. The illustrative visual display shows example parent/child and previous/next relationships among the calls represented by the discrete regions.

The vertical stacking relationships among the regions signifies the call hierarchy relationships among the calls represented by the regions. The trace has three call levels: 0, 1, and 2. Level 0 is the highest level in the call hierarchy followed in order by trace levels 1, 2, etc. Although only three call levels are shown, it will be appreciated that a call hierarchy may include more than three call levels. Calls at the highest call level are shown at the top most vertical position in the display, and lower level calls are shown in progressively lower vertical positions corresponding to their call levels. Lower level calls (i.e. below the highest call level, call level 0) are disposed entirely beneath the higher level call that called them. The horizontal relationship among the discrete regions represents chronological time, which progresses left to right. The horizontal length of a region represents its time duration relative to other calls. Lower level called programs are shorter in duration than the calling programs that called them, and they complete (end) before their calling programs complete. Calls shown to the left in the example display occur after calls shown to the right. Thus, the illustrative trace display shows both call hierarchies and chronological time relationships among call hierarchies.

Higher level calls encapsulate lower level calls within the illustrative display. Within a first encapsulation block 304 call A encapsulates calls B, C and D. Within a second encapsulation block 306 comprises call E encapsulates calls F, G and H, and call F encapsulates calls G and H. Within a third encapsulation block 308 call I encapsulates calls J, K and L. Conversely, each encapsulation block can be viewed as an event and higher level events can be classified as containers to lower level events within the same encapsulation block. Thus, for example E is a container to F, G and H, for example.

Calls within an encapsulation block that have hierarchical relationships are represented in the display as vertically stacked discrete regions with vertical relations indicative of calls from one program to another program. A program that makes a call to another program is referred to herein as 'parent', and the called program is referred to herein as the 'child'. A call may serve as a parent relative to one call and as a child relative to another call. In the display, a discrete region that is interposed between two other regions represents an occurrence of a call through three levels of the hierarchy and that acts in both the parent and child roles.

In the example display the vertical disposition of a call, i.e. of its discrete region corresponds to its level in the call hierarchy. A call located in a vertically higher position in the display that is at a higher call level makes calls to calls disposed vertically beneath it lower in the display. For example, in the illustrative trace the middle discrete region F represents a program that has been called by a program represented by the adjacent region E on a first side and that has made a call to other programs represented by adjacent regions G and H on its (opposite) second side. The interposed call block F is a child call relative to the call E on its first side and is a parent call relative to the calls G and H on its second side.

The hierarchical call encapsulation blocks are recorded in the course of operation of a computer system and are chronologically ordered. Each discrete region representing a highest level (level 0) call is disposed in the display is contiguous horizontally (i.e. in the time direction) with the next occurring highest level block in the trace. Lower level regions also are time ordered and are horizontally aligned to be disposed entirely within the horizontal time frames (i.e. within the time duration) of the higher level programs that called to them. Thus, calls B, C and D are disposed within the time frame of call A. Calls G and H are disposed within the time duration of call F, which in turn, is disposed within the time duration of call E. Calls J, K and L are disposed within the time duration of call I. Each highest level call has a previous/next relationship with adjacent highest calls. Moreover, within a call encapsulation block, calls that are at the same level have previous/next relationships between them.

The hierarchical call encapsulation blocks also are indicative of call stacks for events. A call stack for each event would be the event itself and all the parents to level 0, e.g. the call stack for event G would be GFE and for H would be HFE.

In the illustrative display of FIG. 3, in the first call level, level 0, call A has a previous relationship with call E. Call E has a next relationship with call A and has a previous relationship with call block I.

In the second call level, level 1, call B has a previous relationship with call C. Call C has a next relationship with call B and has a previous relationship with all D. Call D has a next relationship with call C and call D has a previous relationship with call F. Call F has a next relationship with call D and has a previous relationship with call J. Call J has a next relationship with call F and has a previous relationship with call K. Call K has a next relationship with call J and has a previous relationship with call L. Call L has a next relationship with call K.

In the third call level, level 2, call G has a previous relationship with call H, and call H has a next relationship with call G.

In operation, a user interface display such that of FIG. 3 can be used to more easily navigate within a trace though selection of discrete regions or call blocks or through selection of sets of discrete regions or call blocks to facilitate analysis of even large log files with millions of log call entries. The user interface also can more easily allow aggregation of trace information on demand. In some embodiments, color coding is used to differentiate information such as call levels, parent/child relationships, and previous/next relationships and to highlight important information to make it more visually accessible to a skilled user. With this improved accessibility to trace information, a user can more readily optimize an application's time (horizontal axis) performance (e.g. by optimizing access to the database) and can evaluate and optimize calls within a complex hierarchy (vertical axis).

Pre-Processing

Generation of a call trace screen display containing graphical representations of parent/child and previous/next call relationships to facilitate easy navigation through trace log file information requires production of information structures that correspond to display features. Raw log file data is pre-processed on the fly as it is read from the log file to place the data in better condition for use in creating the information structures and generating corresponding display elements. The pre-processed data then is used to produce the display-related information structures, e.g. discrete regions, used to more easily analyze call trace information and to navigate among the trace log entries.

One pre-processing task involves reduction of spaces and delimiters. Spaces and delimiters included in trace text ordinarily are important for text-only visual presentation purposes so that a computer user can recognize and interpret and discriminate between different chunks of information. A trace log file ordinarily consists of a simple text list. Typically, each log entry has some valuable information about an event that occurs in the course of the execution of computer software in a computer system. For storage reasons, text and numbers often are stored in fixed-length fields. For example, the text "Execution" might be stored in a trace log file as "Execution______". The number "5" might be stored in a trace log file as, "______5". Note the blank spaces associated with unused portions of the fixed length fields. In order to reduce the amount of text-related information that is stored, empty spaces are removed when the log file is read Note that in general, a read is related to reading data from a file. So, for example, the data may be read in chunks of bytes, e.g. 50000 Bytes per chunk. The chunks are then being analyzed in the mentioned fashion after they have been aligned to form lines. The benefit of reading data in chunks is that it is fast, but the downside is that it is not necessarily clear what a line is. A number of Bytes have to be interpreted as a line. Typically, this is done by observing line delimiting characters, a very common practice in computer science. The available lines are then processed in the aforementioned fashion.

To further reduce the amount of text that is stored, delimiting characters such as "|", "-", etc., that are non-essential also are removed. For each character, a determination is made as to whether or not the character falls into the category of a space or non-essential character. For example, the stored text representation of the number "______1,234" is transformed to "1234". Note that empty spaces are removed and the delimiter "," also is removed. The stored text representation of, "Call Program XYZ______", is transformed to "Call Program XYZ". Note that empty spaces are removed. This transformation is achieved by processing individual characters in the text.

Figure 4:
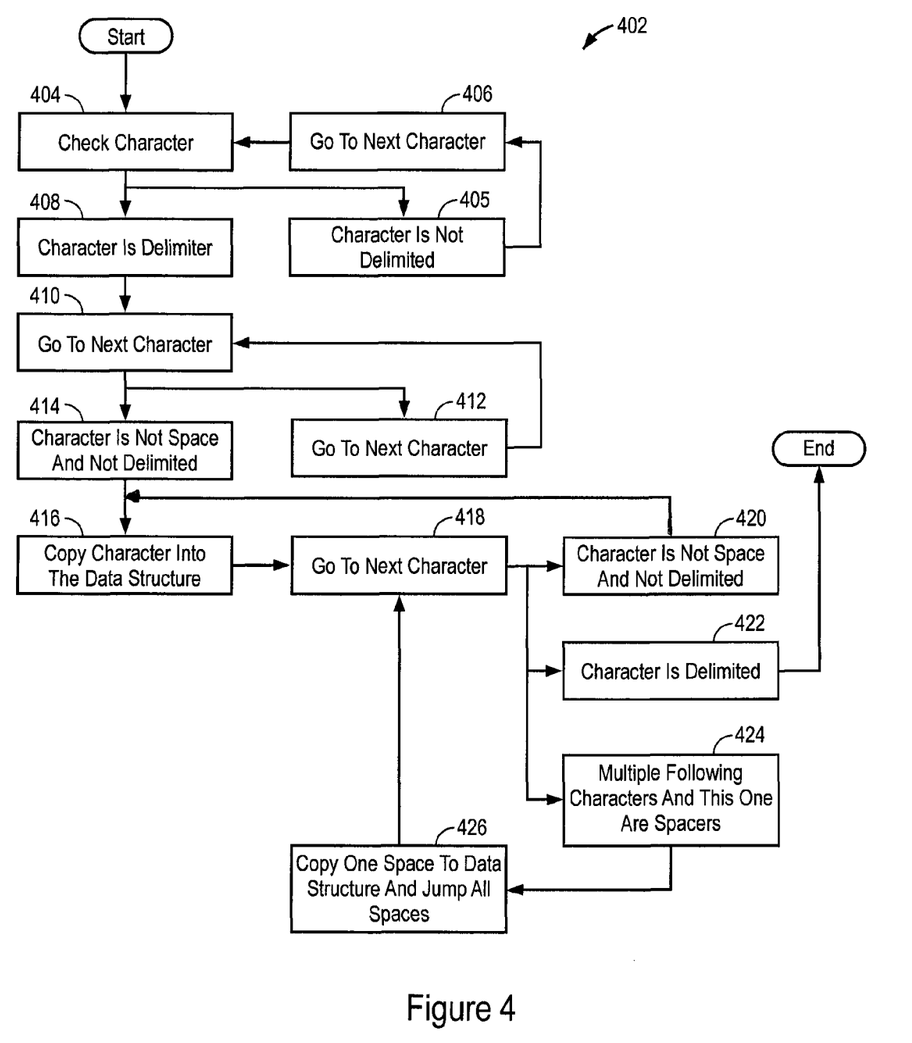
FIG. 4 is an illustrative state transition diagram representing a process to reduce spaces and remove non-essential delimiters from text of a trace log file and to store remaining text in data structures in accordance with some embodiments.

FIG. 4 is an illustrative state transition diagram representing a process 402 to reduce spaces and remove non-essential delimiters from text of a trace log file and to store remaining text in data structures in accordance with some embodiments. A computer system is configured according to program code to perform the state transition process of FIG. 4. Different modules in the drawing represent different configuration states of the system in the course of implementing the process 402. Since a graphical trace display like that of FIG. 3 does not require these extraneous spaces and delimiters, the essential content (minus extraneous spaces and delimiters) can be stored more compactly in a data structure such as a table, for example.

The process 402 runs as text characters (including spaces) are read from a trace log file. At the start, at module 404 character has been selected, and if the selected character is not a delimiter, then state transitions to module 405 and then to module 406 where a next character is selected. The process 402 then transitions back to module 404. Transitioning around the loop comprising 404 to 405 to 406 and back to 406 continues until the currently selected character is a delimiter; and then state transitions to module 408 and then to module 410 in which a next character is in the text string is selected. If the next character is a space then state transitions to module 412 and then transitions back to 410. If the next character is not a space and is not a delimiter, then state transitions to module 414. From state 414, state transitions to module 416 in which the character at 414 is copied into a data structure. From state 416, state transitions to module 418 where a next character in the text trace is selected. If the next character is not a space and is not a delimiter, then state transitions to module 420 and then back to module 416 where that next character is copied into a data structure in a computer readable storage device. If at module 418, the next character is a delimiter, then state transitions to module 422, and the process ends. If at module 418, the next character and multiple following characters are spaces, then state transitions to module 424. Following module 424, state transitions to module 426 in which one space is copied to the data structure and then all of the other spaces are skipped. Following module 426, state transitions back to module 418. It will be appreciated that the above-mentioned data structure into which one or more essential characters are copied may comprise fields of a table or table-like structure encoded in a computer readable storage device. Thus, the process 402 achieves a transformation of information to a more compact form by removal of characters and spaces that are important to making the information comprehensible to persons but that is not relevant to computation of results, for example.

Another pre-processing task involves unification of common text elements. Text is analyzed using a computer system as the text is read from the trace log file, and prescribed common or frequently occurring text elements are replaced with different text elements that occupy less storage space in a computer readable storage device. Thus, certain commonly occurring text elements are transformed to a compressed form. Some illustrative example common text elements are "Call Program . . ." or "Execute Method . . ." Each of these example text elements is used to indicate that whatever text follows indicates some dynamic computer program code or method name that is to be run or executed. Different dynamic program code or methods may follow different occurrences of these common text elements. In operation, as text is read from the trace log file, common text element patterns are identified and replaced with compressed representations of the common text element patterns. For example, the multi-character text element, "Call Program", may be replaced by the with a single character text element, such as, "1", thus reducing the storage size of the trace because the number "1" is stored in a computer readable storage device in place of each occurrence of the text element "Call Program".

In addition this transformation adds implicit semantic information to the trace, introducing additional dimensions to search the trace by. Semantic information relates to the concept of giving information meaning. The text has been compressed, but in addition, due to internal mappings the text can now be treated as a piece of information that has meaning in a broader context. For example, prior to the above processing, the text 'Call Program' is just text. However, compressing it to a value '1' not only converts it to a different representation but also relates it to a special event of calling a program, which can make data manipulation easier. In addition the semantic information relates to the concept of knowing how a single event is to be perceived in a broader context. Before processing, we had numbers and letters. After processing, we have level information, call type information, time information that are more meaningful than before, especially since it is useful to produce a visual display.

Moreover, in some trace log files, different commonly occurring text elements may have the same meaning; there may be different ways to describe the same thing. For example, the text patterns, "Call Program", "Call Prog.", "Call Pr.", and "C. Program" all could have the same meaning. In accordance with another aspect, as text is read from the trace log file, a computer system is used to automatically identify different text patterns that have a common meaning and to map each of those different text patterns to a unified text pattern. Thus, for example, each of the above text patterns might be mapped to, and transformed to and be stored in a storage device as the unified text pattern, "Call Program" or "1".

The removal of extraneous information and the unification of common text elements can improve computational and storage efficiency since producing an information structure, described below, used to generate a display like that of FIG. 3 may involve processing of hundreds of thousands or millions of log entries.

Yet another pre-processing task involves determining explicit start and end times for call events. Each trace log file call entry typically contains certain specific information such as call level, gross time and net time. Since a call trace is recorded based on events occurring one after another, the trace is chronologically ordered. In the course of reading call trace log entries, a computer system determines explicit start times and end times for call events based upon the chronological ordering of call events and net and gross times of the call events. The start and end times for each call event are stored in computer readable media in association with the respective call event records. It will be appreciated that the start time of a later occurring log entry is always equal or larger (later) than the start time of an earlier occurring log entry. The determined start and end times for each event are stored in computer readable storage in association with other information pertaining to the event.

Time information for individual call events is used to improve computational efficiency during display generation to thereby speed up the generation of a visual display of a trace. For example, typically, a visual display will have a time scale with some minimal resolution. In some cases, the display resolution may be adjusted dynamically by a user. Events with a duration that is shorter than the minimal time resolution for the display are not visible in the display. Moreover, a parent event has a duration that is greater than the combined duration of its child events. Thus, if the parent event has a duration that is below the time resolution of the display, then the child events of that parent also have durations that are below the display time resolution.

Hierarchical Indexing is another pre-processing task. During reading of a call trace log file, navigation information structures are created and encoded in a computer readable storage device, to allow a user to more rapidly navigation between locations in the trace to produce screen displays like that of FIG. 3 for select trace locations. With the use of unifying text (described above), call event log entries are chronologically sorted within a computer readable storage device that associates text names with chronologically ordered log entries. Table 1 provides an illustrative example showing a first navigation information structure, i.e. an index, that chronologically sorts of calls. Note that Entries 3 and 4 are associated with the same category of call event.

TABLE 1

| Text Name/Identifier | Chronological Trace Log Entry Number |
|---|---|
| A | Entry 1 |
| C | Entry 2 |
| E | Entry 3 |
| E | Entry 4 |
| B | Entry 5 |

The text identifiers, e.g., call names, from the chronological list of Table 1 also are stored in computer readable storage device in a prescribed order, e.g., alphabetical order, in association with links (references) to the entries to which they correspond. Table 2 provides an illustrative example showing second navigation information structure that alphabetically sorts of text identifiers for categories of calls and associates them to actual occurrences of such call, i.e. call events, in the call trace log file. Note, for example, the call with the text name E is associated with pointers to two call trace log file entries entry 3 and to entry 4.

TABLE 2

| Alphabetical Text Name/Identifier | Trace Log Entry Number |
|---|---|
| A | Pointing to entry 1 |
| B | Pointing to entry 5 |
| C | Pointing to entry 2 |
| E | Pointing to entry 3 and 4 |

This second navigation information structure facilitates searching through trace entries based upon prescribed call identifiers (e.g., keywords) more rapidly than if one had to search through the trace chronologically.

Information Structure with Parent/Child and Previous/Next Relationships

Figure 5:
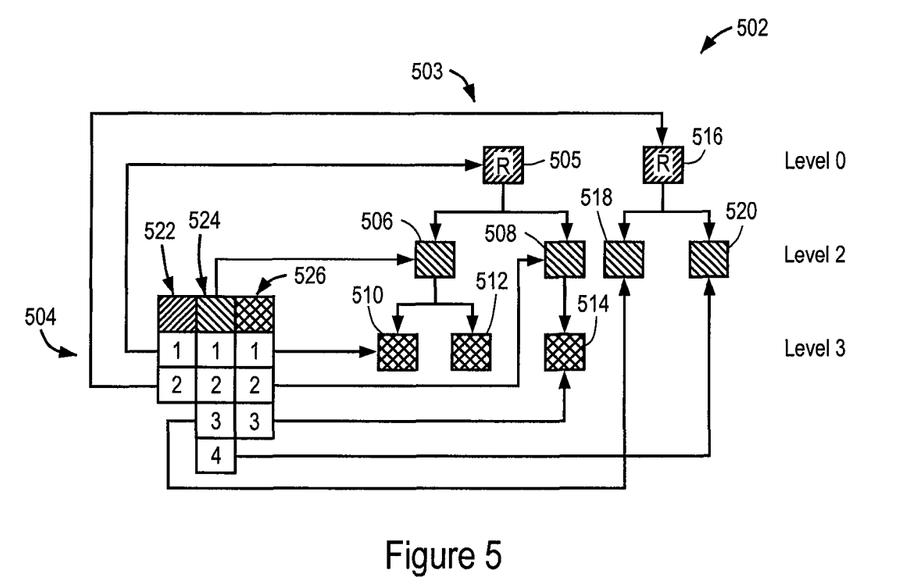
FIG. 5 is an illustrative drawing of an information structure including hierarchical parent/child relationships among calls and including previous/next relationships among calls in accordance with some embodiments.

FIG. 5 is an illustrative drawing of an information structure 502, stored in a computer readable storage device, including hierarchical parent/child relationships among calls and including previous/next relationships among calls in accordance with some embodiments. A hierarchy portion 503 of first section of the information structure 502 provides indicia of hierarchical relations among calls. A time sequence portion 504 of the information structure 502 provides indicia of previous/next relationships among calls. It will be appreciated that for a typical call trace log file containing perhaps hundreds of thousands or millions of calls, a hierarchy plus chronology information structure will be quite large and that the illustrative information structure 502 shows only a very small illustrative portion of the overall structure.

Referring to the hierarchy portion 503, a first level 0 call 505 is associated with a first and second level 1 calls 506, 508. The first level 1 call is associated with first and second level 2 calls 510, 512. The second level 1 call 508 is associated with a third level 2 call 514. It will be appreciated that calls 505 to 514 define a first encapsulation block. Second level 0 call 516 is associated with a third and fourth level 1 calls 518, 520. Calls 516 to 520 define a second encapsulation block. It will be appreciated that the call hierarchy allows determinations of a call stack for each event very quickly and intuitively, because all one needs to do is to simply find the shortest path to level 0. Recording all events in between will result in each event's call stack, which is very convenient.

Referring to the time sequence portion 504, level 0 chronological position indicia 522 associate the first level 0 call 505 with a level 0 position 1 and associate the second level 0 call 516 with a level 0 position 2. The time sequence portion 504 includes level 1 chronological position indicia 524 that associate level 1 call records 506, 508, 518 and 520 with level 1 positions, 1, 2, 3, and 4, respectively. The time sequence portion 504 includes level 2 chronological position indicia 526 that associate second level 2 call records 510, 512, and 514 with level 2 positions, 1, 2 and 3 respectively. It will be appreciated that chronological positions are indicative of previous/next relationships. For example, a call event having a chronological position of 2 in any given call level is a next call relative to the call in position 1 in the same call level and is a previous call relative to a call in position 3 in the same call level.

Figure 6:
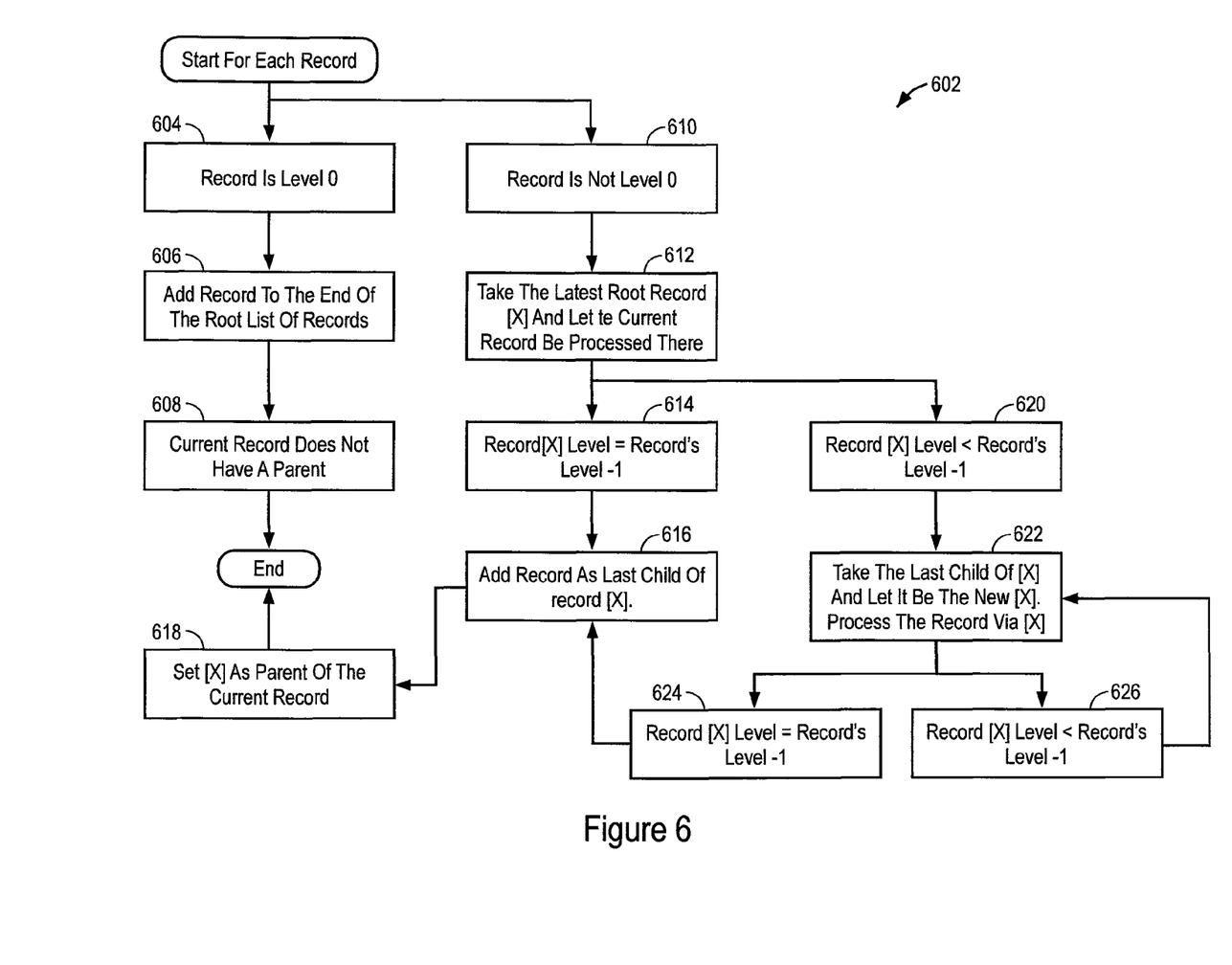
FIG. 6 is an illustrative flow diagram of a process to determine parent child relationships among calls in a call trace log file in accordance with some embodiments.
Figure 7:
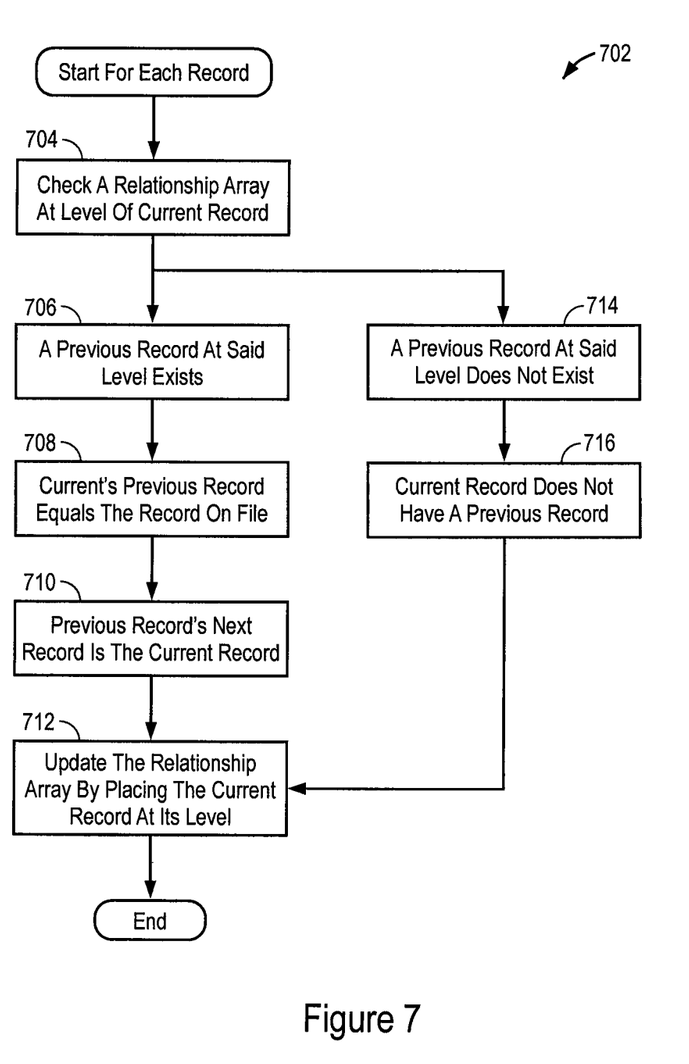
FIG. 7 is an illustrative flow diagram of a process to determine next/previous relationships among log entries in a trace in accordance with some embodiments.

Creation of the information structure of FIG. 5 requires determination of parent/child and previous/next relationships among call events. FIG. 6 is an illustrative flow diagram of a process 602 to determine parent child relationships among calls in a call trace log file. FIG. 7 is an illustrative flow diagram of a process 702 to determine next/previous relationships among log entries in a trace.

Referring to FIG. 6, determination of parent/child dependency is another pre-processing task. FIG. 6 is an illustrative flow diagram of a process 602 to determine parent child relationships among calls in a call trace log file. A computer system is used to make the parent-child determinations as the call trace according to the process of FIG. 6. Modules within the flow diagram 602 correspond to different configurations of the system in accordance with computer program code.

In the course of creation of the information structure 502, a call 'record' is created for each call trace log entry, i.e. for each call event occurring in the trace log file. Table 3 discussed below, shows example contents of a call record in some embodiments. In some embodiments, call entries are read from storage in chronological order, and each record has indicia of its call level.

For each call record, and therefore for each call entry in the log file, a determination is made as to whether the record, corresponds to a call entry that is level 0 (the highest level in the call hierarchy). If the current record is determined to correspond to a call level 0 entry, then the process 602 flows to module 604. In module 606, the record is added to the end of a root list of records within a hierarchy portion of an information structure, encoded in computer readable device, like that of FIG. 5. The root list comprises calls at call level 0. Module 608 indicates that as a call level 0 record, the call record does not have a parent call record. After module 602, the process 602 ends for the current record.

If on the other hand, the current call record is determined to not be a level 0 record, then the process 602 flows to module 610. In module 612, the most recently occurring root call record is designated as record X for a determination if the entry is a child of that most recently occurring root record. The record designated as record X also is referred to herein as a first other call record. If at module 612 the call level of the current call record is one call level below the call level of record X, the first other call record, then process 602 flows to module 614. In module 616, the current record is identified as the last child call record of the record currently designated as record X. Next, the process 602 flows to module 618, in which the record presently designated as record X, i.e. the first other call record, is modified to indicate that it has a parent relationship (i.e. that it is one level higher in the call hierarchy) with the current call record. If at module 612 the call level of the current record is more than one call level below the call level of record X then process 602 flows to module 620. In module 622, the last (i.e. lowest call level) child of the entry previously designated as record X now becomes the call record designated as record X, i.e. becomes designated as the first other record. If at module 622 the call level of the current record is one level below the call level of the record currently designated as record X, the process 602 flows to module 624 and then to module 616 and then to module 618 as described above. After module 618, the process 602 ends for the current call record. Processing of a next call entry from the trace log file then would begin, and a new call record would be created that corresponds to that next call entry.

If at module 622 the call level of the current record is more than one call level below the call level of the call record currently designated as record X, first other call record, then the process 602 flows to module 626 and then back to module 622. The loop between modules 622 and 626 repeats until the current record is one call level below the record currently designated as record X, the first other call record. Then process 602 flows to module 624 and proceeds as described above.

Referring to FIG. 7, determination of parent/child relationships is another pre-processing task. A computer system is used to make the next/previous determinations according to the process of FIG. 7. Modules within the flow diagram 702 correspond to different configuring of the system in accordance with computer program code.

Referring to FIG. 7; for each call trace log entry, at module 704 a determination is made as to whether there is a previous call record that already exists at the call level of the current log entry record. If in module 704 it is determined that a previous call entry, also referred to herein as a second other call entry, exists at the call level of the current record, the process 702 flows to module 706. Next, in module 708, the current record is modified to indicate a time sequence relationship with the previous record, also referred to herein as a second other call record, in which the second other call record is indicated as a 'previous' record from the perspective of the current record. In module 710, the second other record is modified to indicate a time sequence relationship with the current record, in which the current record is indicated as a 'next' record from the perspective of the second other call record. In module 712, the time sequence portion of a hierarchy structure, encoded in computer readable device, like that of FIG. 5 is updated to include the current record at its call level. After module 712, the process 702 ends for the current record. If at module 704 it is determined that a previous record does not exist then process 702 flows to module 714. In module 716, it is determined that the current record does not have a previous record. Next, process 702 flows to module 712.

Each respective call record of the information structure of FIG. 3 is associated in computer readable storage device with information of the type indicated in the following Table 3. It will be appreciated that not all records will have hierarchical relationships with other call records. A call record that serves as a root node may not have a hierarchical relationship with any other call record, for example. Also, a call record that corresponds to a child call may not have a gross time, for example.

TABLE 3

Call Record Information

Figure 8:
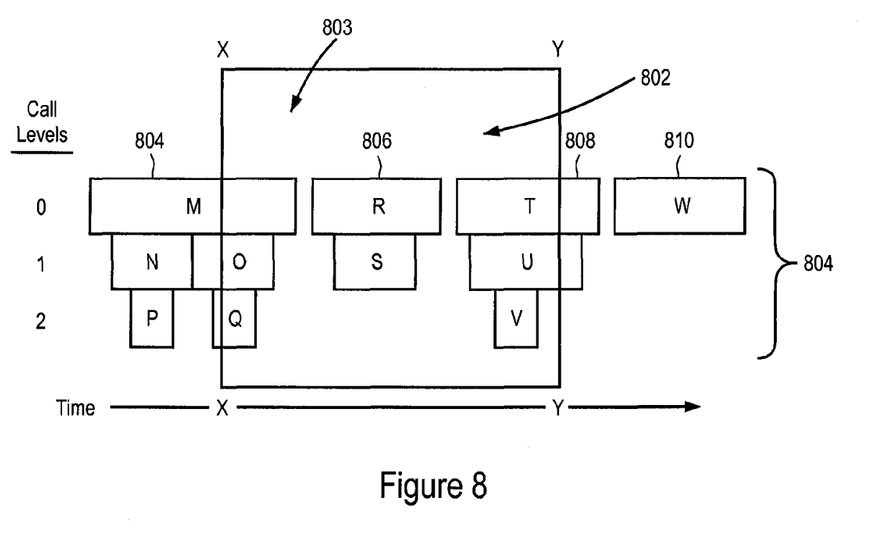
FIG. 8 is an illustrative drawing showing a computer screen display window starting with time X and ending with time Y and showing portions of a trace that are chronologically within and that are chronologically outside the display window in accordance with some embodiments.

Call record identifier
Call Level
Parent call record identifier
Child Call record identifier
Previous Call record identifier (same call level)
Next call record identifier (same call level)
Gross time
Net Time
Start Time
End time Display Window Determination In accordance with some embodiments, a user may specify a display window for a trace display. Portions of a trace within the time window are visually displayed and portions of the trace outside of the time window are not presented in the display. FIG. 8 is an illustrative drawing showing a computer screen display window 803 starting with time X and ending with time Y and representing portions of a trace that are chronologically within and that are chronologically outside the display window. The trace includes multiple call levels: level 0, level 1 and level 2. The time interval between time X and time Y is a small segment of the overall trace.

An encapsulation block 804, which is partially within the display window 803, includes discrete display regions MNOPQ. An encapsulation block 806, which is fully within the display window, includes discrete display regions RS. Encapsulation block 808, which is partially within the window, includes display regions TUV. Display region W is outside the display window.

Display regions MNOPQ are vertically aligned, for example. Region M is disposed vertically above regions N, O, P and Q. Regions N and O are vertically aligned above regions P and Q.

The encapsulation blocks are aligned horizontally in time sequence order regions with the encapsulation block to the right corresponding to calls and call stacks that occur later in the trace log file than calls and call stacks of encapsulation blocks to the left. For example, the calls of encapsulation block 806 occur before the calls of the encapsulation block 808.

Moreover, within each call level, discrete display regions are disposed in time sequence order with regions disposed further to the right within a given call level corresponding to calls occurring later in the trace log file than regions disposed more to the left within the same call level. For example, region U at level 1 corresponds to a call in the log file that occurs later in the trace log file than a call in the trace log file that corresponds to level 1 region R.

In some embodiments, a computer system is configured to apply the following rules in the course of generation of a screen display like that of FIG. 3, for example, to determine what portion of a trace to display. According to the rules, generation of a display corresponding to a particular call event can be skipped if one or more of the following conditions is satisfied:

1. The log entry ends before the left side (beginning) of the displayable window;
2. The log entry starts after the right side (end) of the displayable window;
3. The log entry is too short, meaning its time duration is shorter than the minimal time resolution of the display, e.g., smaller than 1 pixel on the screen;
4. The log entry's level is out of the bounds for the displayable window That is, the restriction of the window is not only true in X coordinate direction but also in Y coordinate direction. So if the window starts its displayable area at call level 3, for example, levels 0-2 will not be displayed, or if the call level is larger than the bottom most border of the displayable window;
5. If a log entry cannot be displayed because of 1, 2 or 3 then none of its hierarchical children are visible.

Application of these rules can reduce the time required to generate a trace by identifying call trace records that need not be evaluated for display thereby reducing the computational time and effort required to generate a call trace display like those of FIG. 3 and FIG. 8, for example. Thus, a user can more rapidly and search through a huge body of log file information. Moreover, presentation of discrete regions displayed graphically so as to both encapsulate call hierarchies in which regions are separated based upon call levels of the calls to which they correspond and to also arrange the regions horizontally to represent time sequence relationships between the call entries that they correspond to, promotes a more intuitive understanding of the trace log file information.

Figure 9:
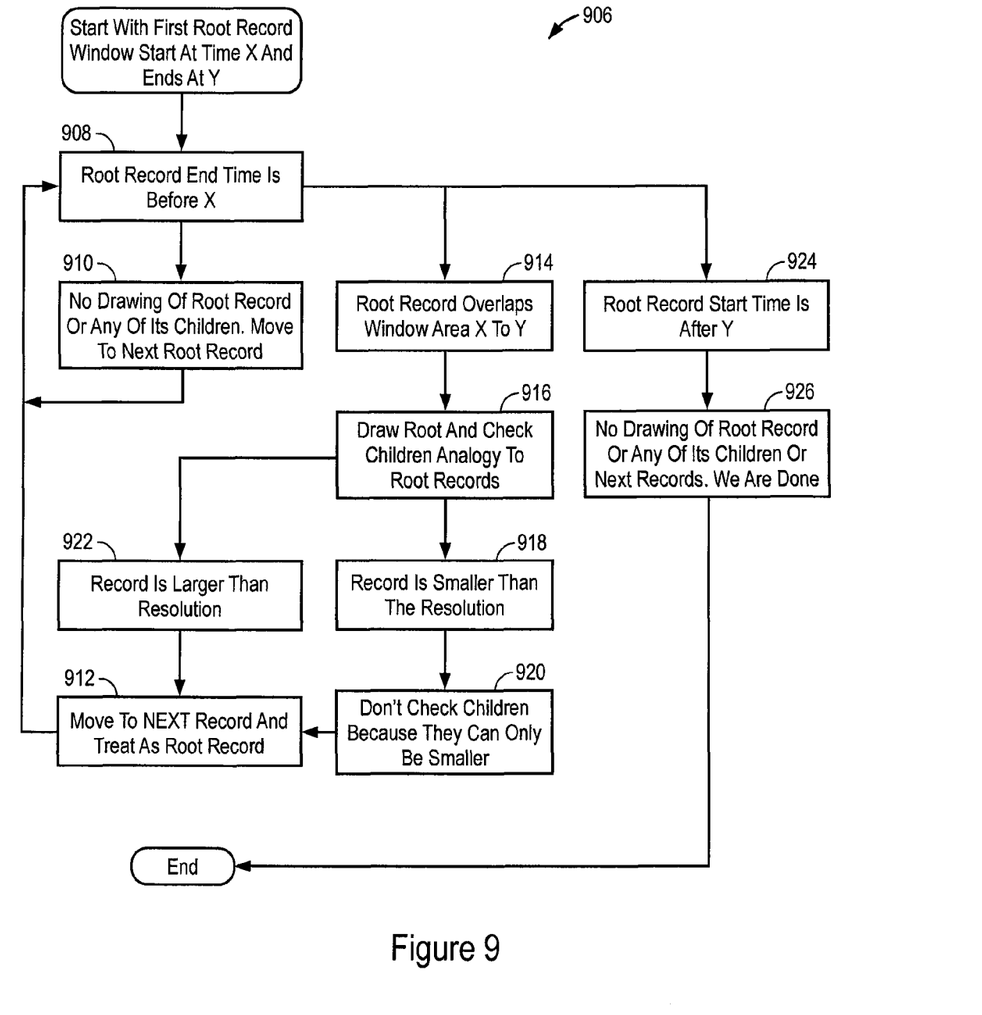
FIG. 9 is an illustrative drawing of a flow diagram of a process 906 to determine whether or not call trace log entries are within a screen display such as that of FIG. 8 in accordance with some embodiments.

FIG. 9 is an illustrative drawing of a flow diagram of a process 906 to determine whether or not call trace log entries are within a screen display such as that of FIG. 8 in accordance with some embodiments. A computer system is configured to generate the screen display and to implement the process. Modules within the flow diagram correspond to different configuring of the system in accordance with computer program code.

The illustrative flow diagram 906 of FIG. 9 starts by selecting a first root call record, i.e. the first highest level (e.g., level 0) record in the trace. Module 908 determines whether the selected root entry 908 has an end time before time X (i.e. before the start of the time window). If the currently selected root record has an end time before time X, then module 910 determines that neither the currently selected root record nor any of its child records are within the window, and that neither the currently selected root record nor its children are to be displayed. Next, module 910 causes the process 906 flow to select a next root call entry. The process 906 then flows once again to module 908.

If the currently selected root record has an end time that overlaps the window between time X and time Y, then the process 906 flows to module 914. Module 916 commences generation of display of the current root record and its children. Note that the generation process results in only those portions of the currently selected root record that overlap in time with the window being displayed within the window. If at module 916, duration of the current root record is less than the minimal resolution time then process 906 flows to module 918. Note that if the time duration of the current root record is less than the minimal time required for display, then the generation process will result in the root record's not being visible in the window. Process 906 next flows to module 920 which determines that the child records of the current root record are not to be displayed. That is, since the root call record is determined to have a time duration that is too short for display, then the children of that root record also necessarily have time durations that are too short for display, and no effort is made to display these child processes. It will be appreciated that skipping generation of the child processes save computational effort. The process 906 then flows to module 912. If at module 916, duration of the current root record is more than the minimal resolution time then process 906 flows to module 922. The process 906 then flows to module 912.

If the currently selected root call record (i.e. level 0 record) has a start time that is after time Y, then process 906 flows to module 924. The process 906 next flows to module 926 determines that neither the current root record nor any of its children are to be drawing. The process 906 then ends.

It will be appreciated that the previous/next information within the structure 502 of FIG. 5 permits searching from one record to the next within a given call level (e.g. the root level—level 0) to determine whether to display information representative of the record within a display window. Moreover, parent/child information within the structure of 502 permits easy determinations that a child display should not be attempted if the parent of the child has a time duration that is too short to be displayed given the current image resolution within the display window.

Traversal of the Trace

An information structures like that of FIG. 5 permits fast and flexible traversal of the trace information in the both a call dimension and in a time-of-occurrence dimension. The previous/next information within the time sequence portion 504 can be used to traverse forwards and backwards in time. For example, a user may provide an input to a user interface that includes a display like that of FIG. 3 to designate one or more specific call levels for previous/next searching such that a traversal using an index structure like that of FIG. 5 can be used to selectively search through calls at the selected levels. Also, for example, using indexes such as those of Table 1 and Table 2, a user can search for calls based on a prescribed identifier (e.g., call name) and to determine their locations, which may be dispersed throughout the trace. An information structure like that of FIG. 5 then can be used to generate a display of the dispersed instances of a prescribed call or hierarchy of calls within an aggregation block. Display resolution within a display window may be adjusted to show longer time frames in lesser detail or to show shorter time frames in greater detail, for example.

Command Steps to Traverse to Nearby Trace Records

Figure 10:
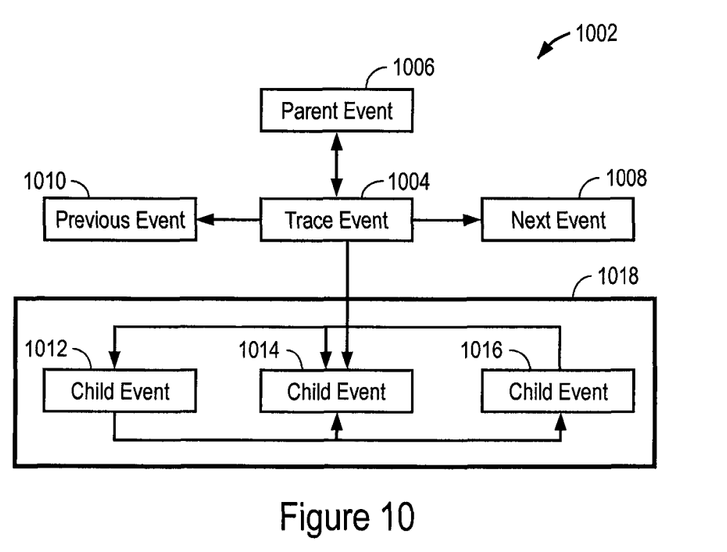
FIG. 10 is an illustrative drawing showing an array of trace records that may be stored in an information structure like that of FIG. 5 and that may be displayed in a trace hierarchy like that of FIG. 3 in accordance with some embodiments.

FIG. 10 is an illustrative drawing showing an array of trace records that may be stored in a computer readable storage device and that may be displayed in a trace hierarchy like that of FIG. 3 together with indicia of the number of user command steps required to traverse from an illustrative 'trace event' 1004 to other events in the collection. The illustrative trace record 1004 can be located within the trace in a single step using a prescribed identifier and an index such as from Tables 1 and 2. FIG. 10 illustrates that using an information structure like that of FIG. 5 as follows.

1. Parent 1006 can be accessed from the trace event 1004 with one step.

2. A next or previous record 1008, 1010, respectively, each can be accessed from the trace event 1004 with one step.

3. Any child 1012, 1014 or 1016 of the trace event 1004 can be accessed from the trace event 1004 with two steps, by referencing to the array of children 1018 and then choosing the child by position number.

Thus, a call trace display like that of FIG. 3 can be traversed from one display region to another in very few steps.

Hardware Environment

Figure 11:
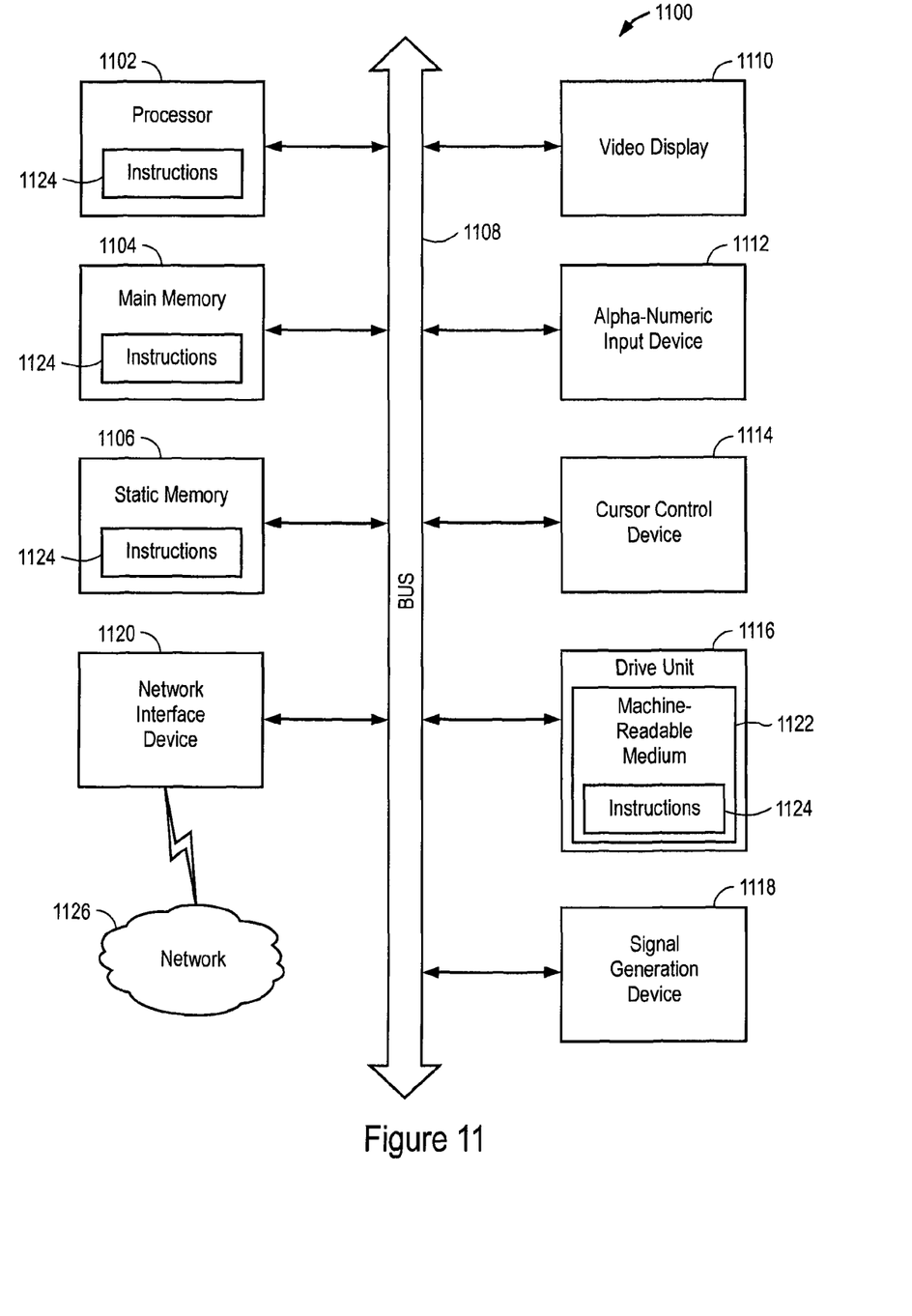
FIG. 11 is a block diagram of a computer processing system within which a set of instructions, for causing the computer to perform any one or more of the methodologies discussed herein, may be executed.

FIG. 11 is a block diagram of a computer processing system within which a set of instructions, for causing the computer to perform any one or more of the methodologies discussed herein, may be executed. In some embodiments, the computer operates as a standalone device or may be connected (e.g., networked) to other computers. In a networked deployment, the computer may operate in the capacity of a server or a client computer in server-client network environment, or as a peer computer in a peer-to-peer (or distributed) network environment. In a networked deployment, the computer may operate in the capacity of a server or a client computer in a server-client network environment, or as a peer computer in a peer-to-peer (or distributed) network environment.

Embodiments may also, for example, be deployed by Software-as-a-Service (SaaS), Application Service Provider (ASP), or utility computing providers, in addition to being sold or licensed via traditional channels. The computer may be a server computer, a personal computer (PC), a tablet PC, a set-top box (STB), a Personal Digital Assistant (PDA), cellular telephone, or any processing device capable of executing a set of instructions (sequential or otherwise) that specify actions to be taken by that device. Further, while only a single computer is illustrated, the term "computer" shall also be taken to include any collection of computers that individually or jointly execute a set (or multiple sets) of instructions to perform any one or more of the methodologies discussed herein.

The example computer processing system 1100 includes processor 1102 (e.g., a central processing unit (CPU), a graphics processing unit (GPU) or both), main memory 1104 and static memory 1106, which communicate with each other via bus 1108. The processing system 1100 may further include video display unit 1110 (e.g., a plasma display, a liquid crystal display (LCD) or a cathode ray tube (CRT)). The processing system 1100 also includes alphanumeric input device 1112 (e.g., a keyboard), a user interface (UI) navigation device 1114 (e.g., a mouse, touch screen, or the like), mass storage that comprises a disk drive system 1116, a signal generation device 1118 (e.g., a speaker), and a network interface device 1120.

The trace log file may be stored in the disk drive system 1116. The information structure 502 of FIG. 5 also may be stored in the disk drive system 1116. During display of a representation like that of FIG. 3, the information structure, or portions of it may be loaded within main memory 1104.

The disk drive unit 1116 includes computer-readable medium 1122 on which is stored one or more sets of instructions and data structures (e.g., software 1124) embodying or utilized by any one or more of the methodologies or functions described herein. The software 1124 may also reside, completely or at least partially, within the main memory 1104 and/or within the processor 1102 during execution thereof by the processing system 1100, the main memory 1104 and the processor 1102 also constituting computer-readable, tangible media.

The software 1124 may further be transmitted or received over network 1126 via a network interface device 1120 utilizing any one of a number of well-known transfer protocols (e.g., HTTP).

While the computer-readable medium 1122 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the computer and that cause the computer to perform any one or more of the methodologies of the present application, or that is capable of storing, encoding or carrying data structures utilized by or associated with such a set of instructions. The term "computer-readable medium" shall accordingly be taken to include, but not be limited to, solid-state memories, and optical and magnetic media.

While the invention(s) is (are) described with reference to various implementations and exploitations, it will be understood that these embodiments are illustrative and that the scope of the invention(s) is not limited to them. In general, techniques for maintaining consistency between data structures may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s). The foregoing description and drawings of embodiments in accordance with the present invention are merely illustrative of the principles of the invention. Therefore, it will be understood that various modifications can be made to the embodiments by those skilled in the art without departing from the spirit and scope of the invention, which is defined in the appended claims.

The invention claimed is:

1. A method to produce an information structure encoded in a non-transitory machine readable storage device that indicates call hierarchy relationships among calls of a trace log file and that indicates time sequence relationships among calls of the trace log file comprising:
   producing respective call records in a non-transitory computer readable storage device that correspond to respective calls identified in the trace log file;
   creating respective call hierarchy indicia associated with respective call records, wherein for each respective call record associated with a call hierarchy indicia, its associated call hierarchy indicia indicate a hierarchical parent relationship between the respective call record and another call record that is its parent record, if a parent call record exists for the respective call record, and that indicates a hierarchical child relationship between the respective call record and another call record that is its child record, if a child call record exists for the respective call record; and
   creating respective time sequence indicia associated with respective call records, wherein for each respective call record associated with a time sequence indicia, its associated time sequence indicia indicate a previous to relationship time sequence between the respective call record and another call record that is previous to the respective call record, if a previous call record exists for the respective call record, and that indicates a next to relationship time sequence between the respective call record and another call record that is next to the respective call record, if a next call record exists for the respective call record.

2. The method of claim 1 wherein the act of creating call hierarchy indicia further includes:
   selecting respective call entries in chronological order of occurrence in the trace log file; and
   if a currently selected call entry has a hierarchy relationship with a first other call entry, then associating a respective record designated as a current record that corresponds to the currently selected call entry with indicia that identifies the call hierarchy relationship with the first other respective record that corresponds to the first other call entry.

3. The method of claim 2,
   wherein the indicia that identifies the call hierarchy relationship with the first other respective record indicates a child call relationship.

4. The method of claim 2 wherein the act of creating call hierarchy indicia further includes:
   associating the first other respective record with indicia that identifies a call hierarchy relationship with the respective current record.

5. The method of claim 4,
wherein the indicia that identifies a call hierarchy relationship with the first other respective record indicates a child call relationship; and
wherein the indicia that identifies a call hierarchy relationship with the respective current record indicates a parent call relationship.

6. The method of claim 2 wherein the first other call entry occurs chronologically earlier in the trace log file than the currently selected call entry.

7. The method of claim 2 wherein the act of creating call hierarchy indicia further includes:
determining whether the currently selected call entry has a hierarchy relationship with the first other call entry.

8. The method of claim 7 wherein determining includes reading from the trace log file information that indicates whether the currently selected call entry has a hierarchy relationship with the first other call entry.

9. The method of claim 2 wherein selecting respective call entries in chronological order of occurrence includes:
reading respective call entries from a trace log file stored in a non-transitory computer storage device in chronological order of occurrence of corresponding events represented by the call entries.

10. The method of claim 1,
wherein if a currently selected call entry does not have a hierarchy relationship with the first other call entry, then associating the respective current record with indicia that identifies it as a root node.

11. The method of claim 1 wherein the act of creating time sequence indicia further includes:
selecting respective call entries in chronological order of occurrence in the trace log file; and
associating a respective record designated as a current record that corresponds to the currently selected call entry with indicia that identifies a time sequence relationship with a second other respective record that corresponds to second other call entry.

12. The method of claim 11,
wherein the indicia that identifies the time sequence relationship with the second other respective record indicates a next relationship.

13. The method of claim 11 wherein the act of creating call time sequence indicia further includes:
associating the second other respective record with indicia that identifies a time sequence relationship with the respective current record.

14. The method of claim 13,
wherein the indicia that identifies the time sequence relationship with the second other respective record indicates one of a next relationship and a previous relationship.

15. The method of claim 11 wherein the second other call entry occurs chronologically earlier in the trace log file than the currently selected call entry.

16. The method of claim 11, wherein the act of creating time sequence indicia further includes:
determining a respective record that corresponds to a call entry that immediately precedes the currently selected call entry at the same call level as the currently selected call entry to be the second other respective record.

17. The method of claim 15 wherein selecting respective call entries in chronological order of occurrence includes:
reading respective call entries from a trace log file stored in a non-transitory computer storage device in chronological order of occurrence of corresponding events represented by the call entries.

18. A method to produce an information structure encoded in a non-transitory machine readable storage device that indicates call hierarchy relationships among calls of a trace log file and that indicates time sequence relationships among calls of the trace log file comprising:
producing respective call records in a non-transitory computer readable storage device that correspond to respective calls identified in the trace log file;
creating call hierarchy indicia in the non-transitory computer readable storage device that indicate hierarchical relationships among calls that correspond to the respective call records; and
creating time sequence indicia in the non-transitory computer readable storage device that indicate time sequence relationships among calls that correspond to the respective call records;
selecting respective call entries in chronological order of occurrence in the trace log file;
if a currently selected call entry has a hierarchy relationship with a first other call entry, then associating a respective record designated as a current record that corresponds to the currently selected call entry with indicia that identifies the call hierarchy relationship with the first other respective record that corresponds to the first other call entry; and
associating a respective record designated as a current record that corresponds to the currently selected call entry with indicia that identifies a time sequence relationship with a second other respective record that corresponds to second other call entry.

19. An article of manufacture that includes a non-transitory computer readable storage device encoded with program code representing an information structure that includes:
a multiplicity of respective call records that correspond to respective calls within a trace log file;
respective call hierarchy indicia associated with respective call records, wherein for each respective call record associated with a call hierarchy indicia, its associated call hierarchy indicia indicate a, wherein for each respective call record associated with a call hierarchy indicia, its associated call hierarchy indicia indicate a hierarchical parent relationship between the respective call record and another call record that is its parent record, if a parent call record exists for the respective call record, and that indicates a hierarchical child relationship between the respective call record and another call record that is its child record, if a child call record exists for the respective call record; and
respective time sequence indicia associated with respective call records, wherein for each respective call record associated with a time sequence indicia, its associated time sequence indicia indicate a that indicate previous to relationship time sequence between the respective call record and another call record that is previous to the respective call record, if a previous call record exists for the respective call record, and that indicates a next to relationship time sequence between the respective call record and another call record that is next to the respective call record, if a next call record exists for the respective call record.

* * * * *